United States Patent
Kattainen et al.

(10) Patent No.: US 11,487,689 B2
(45) Date of Patent: *Nov. 1, 2022

(54) ELEVATOR DATA COMMUNICATION ARRANGEMENT

(71) Applicant: KONE Corporation, Helsinki (FI)

(72) Inventors: Ari Kattainen, Helsinki (FI); Antti Hovi, Helsinki (FI)

(73) Assignee: KONE CORPORATION, Helsinki (FI)

( * ) Notice: Subject to any disclaimer, the term of this patent is extended or adjusted under 35 U.S.C. 154(b) by 926 days.

This patent is subject to a terminal disclaimer.

(21) Appl. No.: 15/973,935

(22) Filed: May 8, 2018

(65) Prior Publication Data

US 2018/0329848 A1 Nov. 15, 2018

(30) Foreign Application Priority Data

May 9, 2017 (EP) .................................... 17170028

(51) Int. Cl.

| | |
|---|---|
| *G06F 13/38* | (2006.01) |
| *G06F 13/40* | (2006.01) |
| *B66B 1/00* | (2006.01) |
| *B66B 5/00* | (2006.01) |
| *B66B 1/34* | (2006.01) |
| *G05B 15/02* | (2006.01) |
| *B66B 1/46* | (2006.01) |

(52) U.S. Cl.

CPC ........ *G06F 13/4027* (2013.01); *B66B 1/3453* (2013.01); *B66B 1/3461* (2013.01); *G05B 15/02* (2013.01); *B66B 1/468* (2013.01)

(58) Field of Classification Search

CPC . G06F 13/38; G06F 13/40; B66B 1/00; B66B 5/00

See application file for complete search history.

(56) References Cited

U.S. PATENT DOCUMENTS

| | | | |
|---|---|---|---|
| 6,173,814 B1* | 1/2001 | Herkel | B66B 1/34 187/248 |
| 6,672,429 B1 | 1/2004 | Thurmond, III | |
| 2015/0114764 A1* | 4/2015 | Taylor | B66B 1/3453 187/393 |
| 2016/0280509 A1 | 9/2016 | Sonnenmoser et al. | |

FOREIGN PATENT DOCUMENTS

| | | | | |
|---|---|---|---|---|
| EP | 2116500 A1 | * | 11/2009 | ............... B66B 1/34 |
| EP | 3 187 448 A1 | | 7/2017 | |
| WO | WO 00/51929 A1 | | 9/2000 | |

* cited by examiner

*Primary Examiner* — David E Martinez

(74) *Attorney, Agent, or Firm* — Birch, Stewart, Kolasch & Birch, LLP

(57) ABSTRACT

Elevator safety and safety related information needs to be sent reliably to safety controlling systems. Existing elevator communication devices may be used for transmitting this information by processing the received safety and safety related information and processing it before sending it over the communication bus from the elevator car or floor equipment to the controlling devices. A separate communication unit may be used for receiving and processing safety and safety related data packets before they are transmitted over a common bus used for safety and safety non-critical submission.

19 Claims, 5 Drawing Sheets

ELEVATOR DATA COMMUNICATION ARRANGEMENT

DESCRIPTION OF BACKGROUND

Modern elevators involve a lot of devices that are capable of processing information. Such devices may relate all aspects of using an elevator. For example, in all modern elevators control keys and information displays in the elevator are computer controlled. In addition to the controlling related devices there may be additional devices for informative or recreational purposes. For example, there may be information screens having changing content, such as advertisements. In addition to the information mentioned above modern elevators involve processing and transmitting safety related information. Typically elevators include a wide range of safety devices that are monitoring different objects. For example, there are safety devices that monitor if the doors of the elevator car and/or doors at the floor are not opening or closing appropriately. When such a defect is detected an alarm or information message must be transmitted to the maintenance staff. In some cases the operation of the elevator may be prevented.

As it is understood from the above, the information sent from the elevator car can be classified into classes according to the importance. Typically there is a division between safety critical information and other information. The safety critical information is of top priority and must be submitted reliably to the destination without any delays.

A conventional solution for providing the reliable and fast transmission of safety critical information is to have separate dedicated communication arrangements for safety critical information. For example, the information that is not safety critical may be transmitted using a commonly known bus systems used in building automation, such as LON (local operating network) or CAN (Controller area network). Then, for safety critical system separate arrangements have been introduced.

SUMMARY

Elevator safety and safety related information needs to be sent reliably to safety controlling systems. Existing elevator communication devices may be used for transmitting this information by processing the received safety and safety related information and processing it before sending it over the communication bus from the elevator car or floor equipment to the controlling devices. A separate communication unit may be used for receiving and processing safety and safety related data packets before they are transmitted over a common bus used for safety and safety non-critical submission.

In the following description the safety critical elevator component may comprise a sensor, which may be a safety switch with at least one direct opening action contact, a safety circuit such as a safety relay arrangement or a combination of two or more non-safety switches, e.g. combination that has improved fail-safe characteristics compared to an individual non-safety switch; these improved fail-safe characteristics may be achieved for example with a serial connection of two or more non-safety switches. The sensor may also be a contactless proximity sensor or other kind of sensor measuring safety-critical information. The sensor may be fitted to measure for example state of the entrances of elevator hoistway, state of elevator car door, the extreme limits of permitted movement of the elevator car in the elevator hoistway, state of elevator car trap door, the operation of the overspeed governor of the elevator, the state of the end buffer(s) of the elevator hoistway, temporary service spaces to be formed in the elevator hoistway, the state of the safety gear to be activated with the overspeed governor, et cetera.

The safety critical elevator component may further comprise a processor and an interfacing circuit for interfacing the sensor with the processor. The safety critical elevator component may also comprise a communication circuit coupled to the processor, or being part of the processor, such that data from the sensor of the safety critical elevator component may be communicated to a communication bus, and via the communication bus further to an elevator control unit and/or to an electronic safety controller, for example.

Furthermore, in the following description the feature "safety critical information", "safety related data packets" and similar expressions are related to elevator safety information and devices. The safety related expressions are limited to the operational safety of an elevator when the elevator is in ordinary use. In the following description the safety non-critical elevator component may be a component for controlling tasks that are not critical from safety point of view of elevator, such as receiving calls from elevator passengers, representing information such as elevator car position information or call information on a screen, allocating calls to be served by elevator cars, controlling elevator movement to transfer passengers between landings, controlling lighting of elevator car, et cetera. The main principle of elevator safety is that it is the task of safety critical elevator components to stop elevator and bring elevator to a safe state in case of an operational anomaly or a failure of a safety non-critical elevator component.

It may also be that a same elevator component has both safety critical and safety non-critical functions. Even in this case the division between safety critical and safety non-critical structures is clear: if a substructure or a sub-circuit of an elevator component performs one or more safety critical functions, that substructure or sub-circuit is then understood as a safety critical elevator component.

In an embodiment an apparatus is disclosed. The apparatus comprises at least one bus connection configured to connect to a communication bus, communication microcontroller associated with the bus connection to control the communication bus, at least one connection configured to connect safety non-critical elevator components and at least one microcontroller configured to communicate with at least one safety critical elevator component, wherein at least one of microcontroller of the at least one microcontroller is coupled with the communication microcontroller. The communication microcontroller is configured to generate a data package comprising an identification code to indicate whether the data packet comprises safety critical information or not and the communication microcontroller being further configured to send to the data packet to the communication bus.

In another embodiment the apparatus further comprises at least two microcontrollers configured to communicate with safety critical components and one of the at least two microcontrollers is configured to receive and transmit further safety critical information from other microcontrollers configured communicate with safety critical elevator components.

In another embodiment the microcontroller configured to receive and transmit further safety critical information is configured to extract the data from the received communication data packets, generate a new data packets comprising the information from a plurality of received data packets and transmit further the generated new data packets.

In another embodiment the apparatus further comprises a second communication microcontroller configured to communicate with a second communication bus. In another embodiment the apparatus is further configured to receive and process data packets received from the second communication bus and transmit processed data packets to the first communication bus.

In a further embodiment the apparatus is further configured to receive and process data packets received from the first communication bus and transmit the processed data packets to the second communication bus.

In an embodiment the communication bus is a local operating network (LON) bus or controller area network (CAN) bus.

In an embodiment an elevator is disclosed. The elevator comprises at least one apparatus as described above and a communication bus, and the at least one apparatus is connected to an elevator safety module and an elevator operation control using the bus. It is particularly beneficial to use the same bus as a need for additional dedicated buses is removed.

In a further embodiment the elevator safety module is further configured to read a data packet from the communication bus and, if the data packet comprises safety critical information, to transfer the safety critical information to at least one safety processing unit of the elevator safety module. In another embodiment the elevator is in ordinary use and the bus is configured to transport elevator calls.

In an embodiment a communication method for an elevator system, wherein the method is performed in a communication apparatus is disclosed. The method comprises controlling a communication bus by a respective communication microcontroller, receiving safety non-critical communication date packets from elevator components, receiving safety critical communication data packets from elevator components, generating a data packet comprising received data packets, wherein the generated data packet comprises an identification code to indicate whether the data packet comprises safety critical information or not and transmitting the data packets to a communication bus. In another embodiment the method further comprises reading a data packet, by an elevator safety module, from the communication bus and, if the data packet comprises safety critical information transmitting the data packet to at least one safety processing unit of the elevator safety module.

In a further embodiment the method further comprises extracting the data from the received communication data packets, generating a new data packet comprising the information from a plurality of received data packets and transmitting further the generated data packet.

In a further embodiment the communication method further comprises communicating with a second communication bus. In a further embodiment the method further comprises receiving and processing data packets received from the second communication bus and transmitting processed data packets to the first communication bus. In another embodiment the method further comprises receiving and processing data packets received from the first communication bus and transmitting the processed data packets to the second communication bus.

In an embodiment the method described above is implemented as a computer program and stored on a computer readable medium.

In an embodiment the safety processing unit is configured to perform a safety shutdown of the elevator if the safety critical information received fulfills safety shutdown criteria. Safety shutdown criteria may be fulfilled, for example is an elevator safety contact opens during elevator operation. Safety shutdown of the elevator can mean that elevator is brought to standstill by closing hoisting machinery brakes and interrupting power supply to hoisting motor.

The benefits of the elevator data communication system described above include the possibility of using a common communication bus for transmitting information that needs to be received reliably and timely. This facilitates an elevator system where safety and/or safety related information do not need their own communication system. Thus, unnecessary components may be removed from the elevator. The arrangement described above further improves the capacity of the commonly used elevator communication system by processing the transmissions so that the payload of existing data packets is used more efficiently and the capacity lost for transmitting protocol headers is minimized. A further benefit of the arrangement disclosed above is that it can be implemented without requiring changes to other components in the elevator system. Thus, it is easy to implement without need for re-design of other components.

BRIEF DESCRIPTION OF THE DRAWINGS

The accompanying drawings, which are included to provide a further understanding of the elevator data communication arrangement and constitute a part of this specification, illustrate embodiments and together with the description help to explain the principles of the elevator data communication arrangement. In the drawings.

DETAILED DESCRIPTION

Reference will now be made in detail to the embodiments, examples of which are illustrated in the accompanying drawings.

In the following description the feature "microcontroller" refers to a small computer or a computing unit. Microcontroller typically comprises at least one programmable processor, memory and input/output peripherals. Typically microcontroller is implemented on a single integrated circuit, however, that is not essential for the discussed elevator data communication arranged but any computing device capable of providing same functionality can be used for the same purposes.

Figure 1:
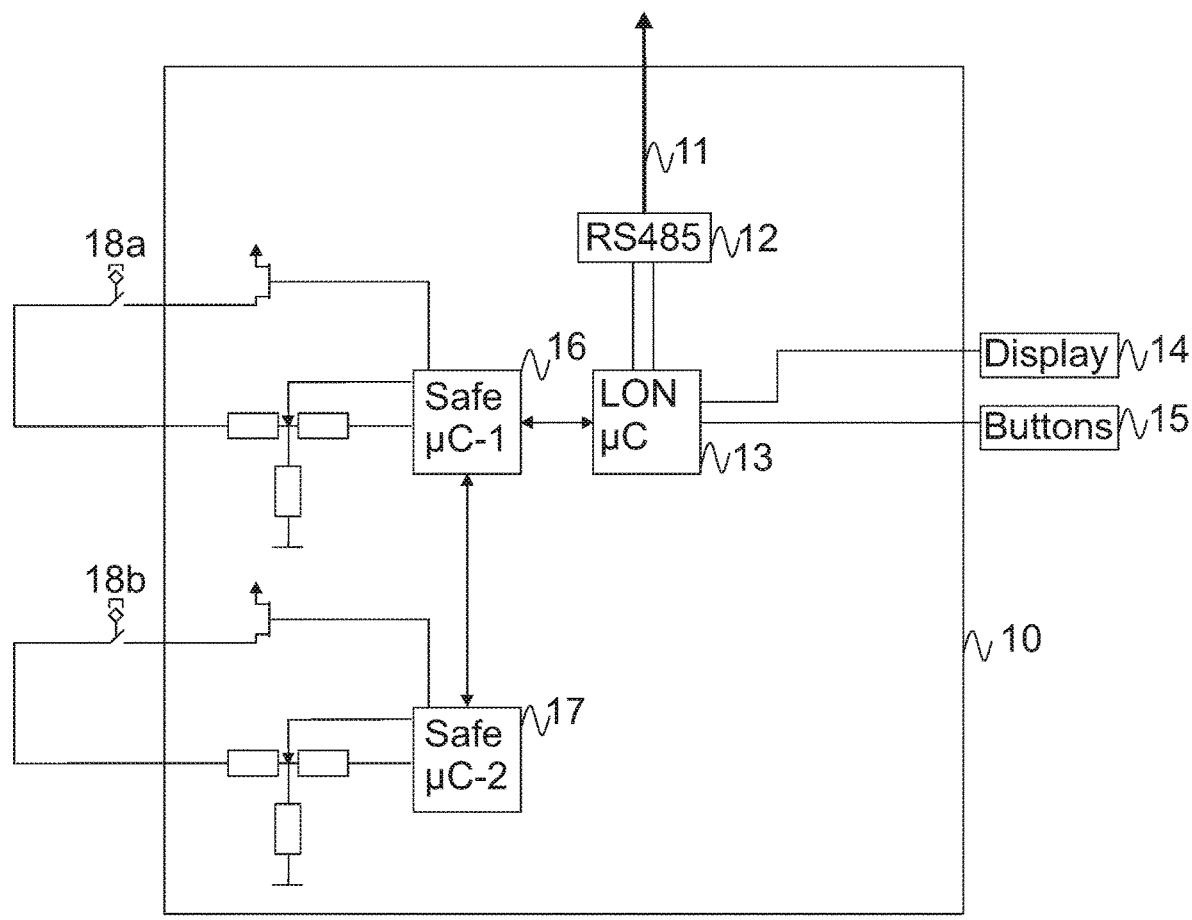
FIG. 1 is a block diagram of a communication card of an elevator data communication system.

In FIG. 1 a block diagram disclosing an arrangement using an elevator with LON (Local Operating Network) is disclosed. The arrangement comprises an apparatus 10, sometimes called as communication card or communication device. In the following description expression communication card is used, however, it should be understood in the context of implemented functions. The communication card of FIG. 1 is connected to a LON bus 11 by using a serial bus 12 and LON microcontroller 13. These are commonly used for devices that are not safety critical, such as a display 14 and control buttons 15 of an elevator.

The communication card 10 of FIG. 1 has been further modified to transmit safety critical information. This is arranged by providing one or more microcontrollers 16, 17 on the communication card 10. In FIG. 1 an example configuration is shown. In the communication card of FIG. 1 two safety related microcontrollers are disclosed. The first microcontroller 16 is connected to the LON microcontroller 13 with bi-directional communication bus, however, it is possible to use also one-way communication bus so that the LON microcontroller 13 only receives communication from first microcontroller 16. In FIG. 1 the second microcontroller 17 is coupled to the LON microcontroller 13 through the first microcontroller 16, however, it is also possible to connect the second microcontroller 17 directly to the LON microcontroller 13.

In FIG. 1 two safety circuits coupled respectively to the first and the second microcontroller 16, 17 are disclosed. In the figure these two safety circuits are identical and comprise one safety switch each. A person skilled in the art understands that safety circuits may be of different type and one microcontroller can control more than one safety switch. In the figure a reed switches 18a, 18b are used. Reed switches are switches that are operated by magnetic field and often used, for example, in elevator doors.

In the following example it is assumed that the reed switches 18a, 18b are attached to the same elevator door which is not closed properly. Thus, a safety alarm needs to be raised. Microcontrollers both 16, 17 receive information from the respective reed switches that doors are not closed correctly. The second microcontroller 17 sends the message two the first microcontroller 16. The first microcontroller 16 receives messages from the reed switch 18a and second microcontroller 17. The first microcontroller 16 extracts the message packet received from the second microcontroller 17 and generates a combined message packet comprising information from reed switches 16, 17 in one message packet.

Figure 2:
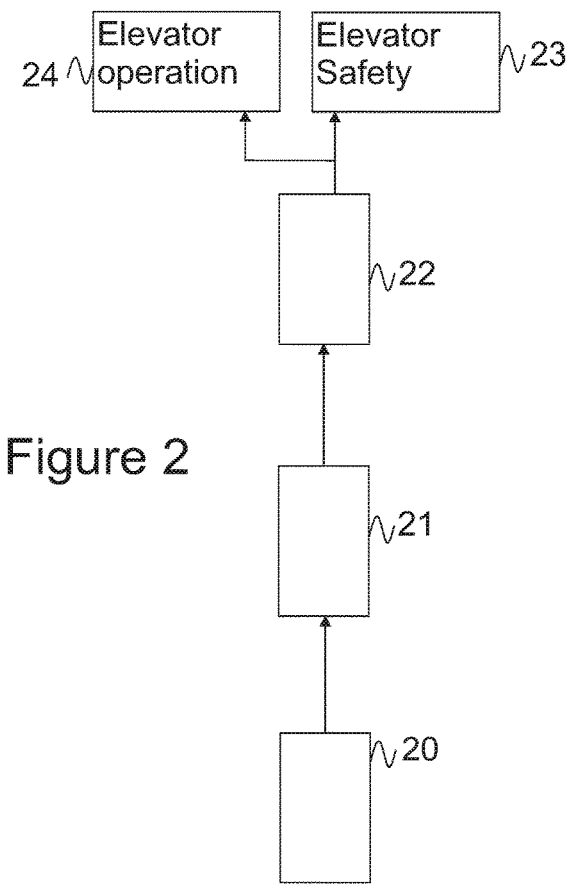
FIG. 2 is a block diagram of an elevator data communication system.

In FIG. 2 a building comprising three floors is illustrated. Each of the floors is equipped with a communication card 20-22 that may be the communication card of FIG. 1 or other communication card comprising same functionality. Arrows between communication cards are illustration the direction of the information flow. The information transmission is implemented, for example, by using LON bus as explained above. Eventually the information reaches an elevator safety module 23 and an elevator operation control 24. The safety critical messages are received at elevator safety module 23 and other messages, such as button and display information, are received at the elevator operation control 24. The elevator safety module 23 is configured to read data packets from the communication bus 11 and, if the data packet comprises safety critical information, to transfer the safety critical information to at least one safety processing unit of the elevator safety module.

As explained above with referral to FIG. 1 communication cards may include connections to a variety of safety switches of different types and other components. Those components are typically chosen when the building is designed, however, it is possible to add new switches and components also afterwards. The communication received from communication cards may be duplicated or districted otherwise to safety module 23 and elevator operation control 24. In case of duplication these entities process the received communication and extract the relevant parts for further processing to at least one safety processing unit. After extraction the messages are treated according to the conventional methods. Thus, the safety processing units are capable of preventing the operation of the elevator if a safety problem is detected. A benefit of the arrangement is that it facilitates use of one single bus for transmitting both control and safety data when the elevator is in the ordinary use. The ordinary use should be understood as normal operation of an elevator, wherein the elevator travels and transports passengers as a response to the placed calls.

Figure 3:
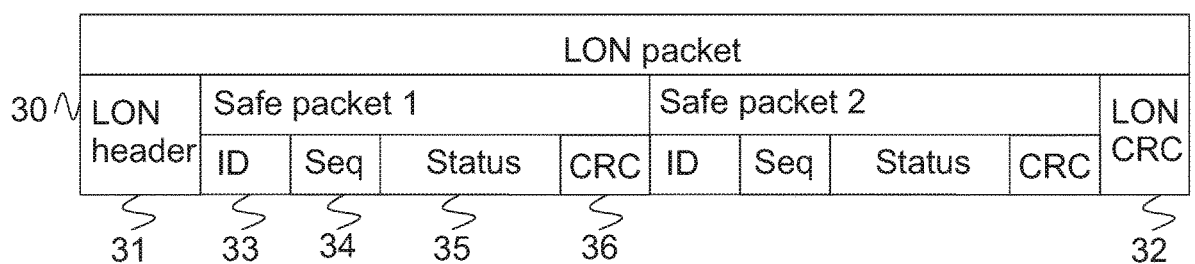
FIG. 3 is an illustration of a data packet used in an elevator data communication system.

In FIG. 3 a data packet structure of a protocol suitable for an arrangement disclosed above is shown. In the figure a LON packet 30 is disclosed. The packet 30 consist of two safe packets as shown in the figure. Safe packets are capsulated inside the LON packet 30 so that first in the LON packet 30 is ordinary LON header 31. After the LON header comes two safety packets and LON CRC 32. Each of the safe packets comprises ID 33, Sequence number 34, Status message 35 (payload) and own CRC 36. From this structure it is possible to detect which packet is safe packet and which is not. The structure of FIG. 3 is naturally an example and any other structure providing means for identifying safe packets from other packets can be used. When safe packets can be identified they can be distributed correctly, for example, in an arrangement shown in FIG. 2. The LON packet 30 may comprise an additional ID field for indicating that there is at least one safe packet inside the LON packet 30. Thus, it will be possible to detect the existence of the safe packet without processing the complete LON packet 30.

Figure 4:
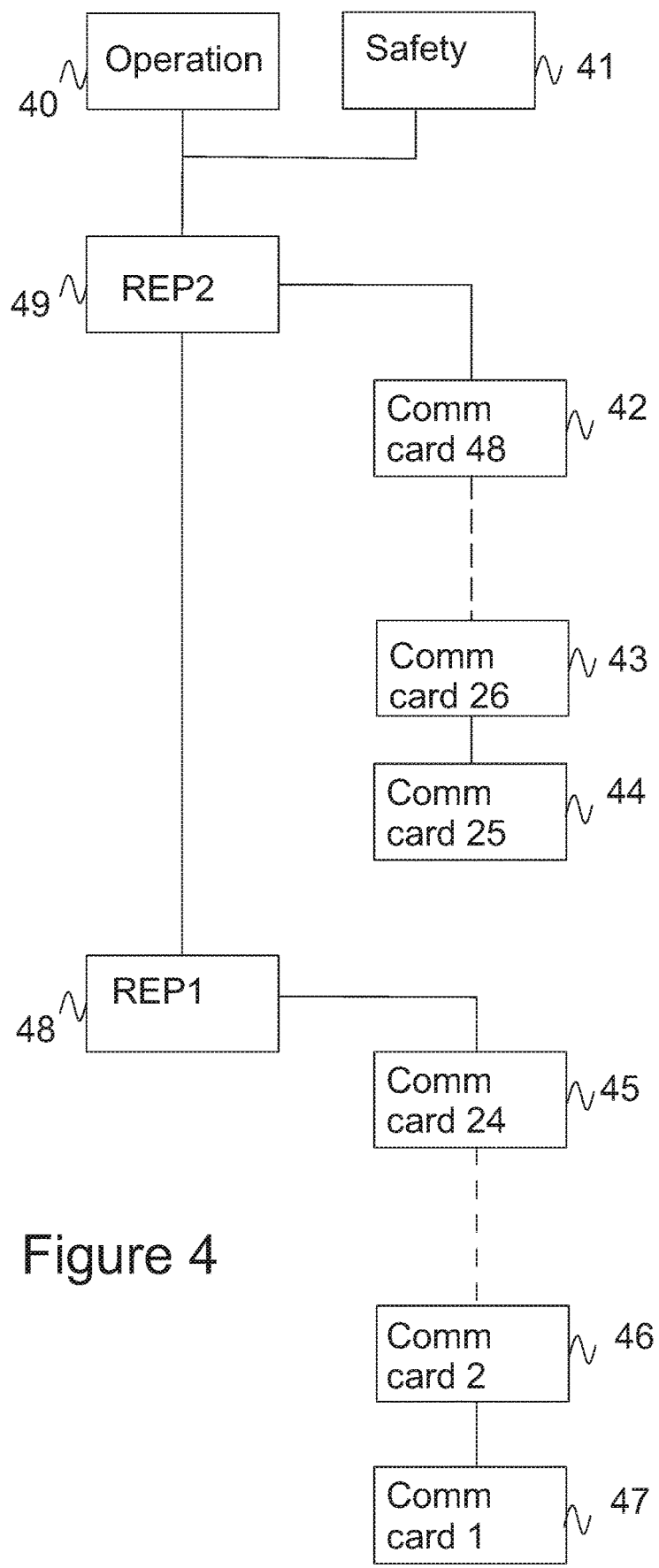
FIG. 4 is a block diagram of an elevator data communication system comprising two segments.

In FIG. 4 an arrangement in a high building is disclosed. As explained earlier the messages are divided to elevator operation controller 40 and safety module 41. The building in the example of FIG. 4 has 48 floors. Each of the floors comprises a communication card 42-48. For clarity reasons only some of the floors are shown in the figure. In the building of figure communication cards are arranged into segments so that the first segment comprises floors 1-24 and the second segment comprises floors 25-48. The communication is arranged by using a LON bus as in the earlier examples, however, each of the segments is connected to a repeater device 48-49. In the figure floors 1-24 are connected to the first repeater 28 and floors 25-48 to the second repeater 49.

Figure 5:
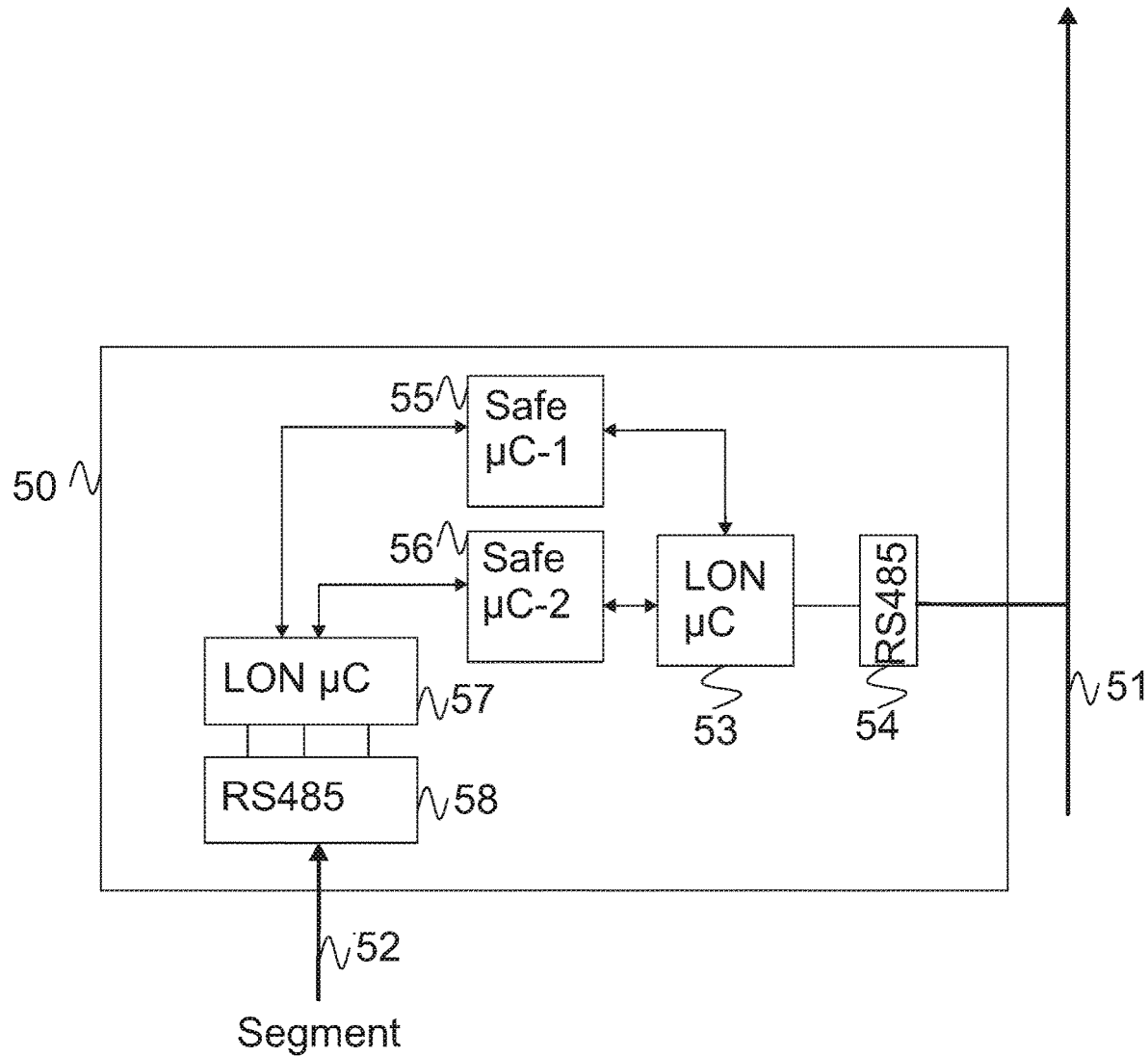
FIG. 5 is a block diagram of a repeater card in an elevator data communication system.

FIG. 5 discloses an example of a repeater card 50. The repeater card 50 is similar to a communication card of previous examples, however, it is configured to receive information from other communication cards in a segment. The repeater card 50 is connected to a LON bus 51 through a serial port 54 and LON microcontroller 53. Furthermore, the repeater card comprises two safe microcontrollers 55 and 56 that are connected to the LON microcontroller 53 as explained above. Safe microcontrollers 55 and 56 are further coupled to a second LON microcontroller 57, which is further connected to a serial port 58 for communicating over a second LON bus 52. The second LON bus 52 is the LON bus of a segment. Thus, all information coming from a segment is received at the repeater card 50 by serial port 58 and the second LON microcontroller 52.

In FIG. 5 two safe microcontrollers 55, 56 are disclosed. It is possible to divide the operation of these microcontrollers, for example, so that the first one is responsible for outgoing messages and the second one for incoming messages so that the segment will be served. In such configuration the first safe microcontroller will process also the non-critical control messages arriving from the segment. These messages may be forwarded without further processing or they may be processed in a similar manner as the safety critical messages so that the messages coming from the segment are packed into one packet. The processing may involve also compression.

Figure 6:
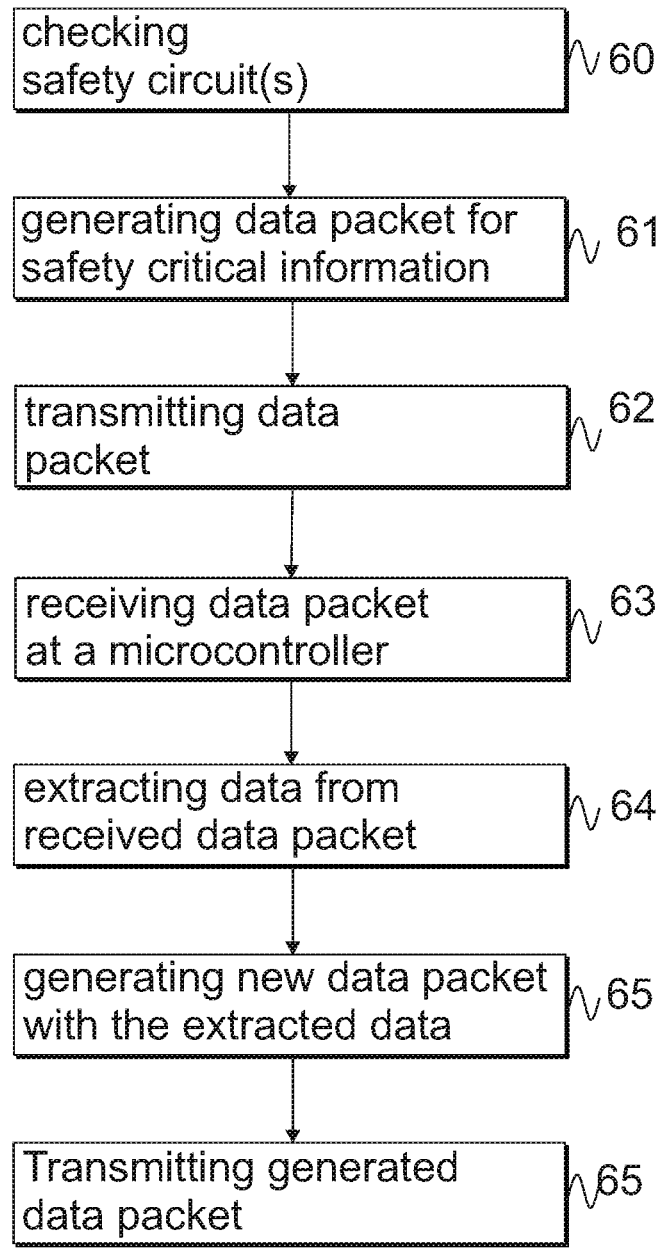
FIG. 6 is a flow chart of an example method used in an elevator data communication system.

In FIG. 6 a method using an arrangement similar to the elevator data communication arrangement as discussed above is disclosed. In the method first safety circuits are checked, step 60. The safety circuits are typically checked at regular intervals and a status signal is generated. The status signal indicates if everything is as it should be or if there is a possible problem.

When the safety circuit has been checked and the respective status has been acquired, a data packet comprising the information is generated, step 61. The packet includes information that is relevant for identifying a safety switch that indicates a possible defect. Typically this is done by a microcontroller controlling the safety circuit. The generated packet is then sent further, step 62. As explained above, as the status is checked on regular intervals, it is also possible to generate and transmit the data packets on regular intervals. The frequency of generation and transmission may be regulated by authorities responsible for elevator safety. Thus, the preferred frequency may change according to the installation parameters and installation country.

The packets are received at a microcontroller or similar processing unit, step 63. The microcontroller extracts the received data packets over a time interval so that a plurality of packets may be received extracted during that interval or time period, step 64. The received and extracted data is then used for generating new data packet that is a combined packet comprising a plurality of received and extracted data packets, step 65. The generation may have same or different frequency as discussed above. For example, it is possible that a combined data packet is sent after a specified time period has expired. In another embodiment the combined packet is generated always after a predetermined number of received packets have been extracted. In another embodiment the frequency is a combination of above, wherein a combined packet is generated always when a threshold number of extracted packets is exceeded or a predetermined time interval is exceeded. For example, a packet may be generated after every 200 ms or ten extracted packets. The interval and related rules are typically determined according to the need set by the regulations. The generation step may comprise generating an identification code indicating whether the data packet comprises safety critical information or not. After generation the packets are sent further, step 66. The identification code is particularly useful as safety related devices may ignore the data packet if there is no indication of safety related information. The device may be any device that is using the safety related information. The using may include, for example, receiving the safety information by a communication card similar to communication card 10 of FIG. 1 or a repeater card 50 of FIG. 5. The communication card 10 or repeater card 50 may reprocess or repackage the received information and provide the corresponding identification code also in the repackaged data packet.

The method disclosed above is disclosed in an environment having only one segment. When more than one segment are used data packets may be received from safety circuits and/or other communication cards.

The above mentioned method may be implemented as computer software which is executed in a computing device able to communicate with a mobile device. When the software is executed in a computing device it is configured to perform the above described inventive method. The software is embodied on a computer readable medium so that it can be provided to the computing device, communication card 10 of FIG. 1.

As stated above, the components of the exemplary embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Common forms of computer-readable media can include, for example, a floppy disk, a flexible disk, hard disk, magnetic tape, any other suitable magnetic medium, a CD-ROM, CD±R, CD±RW, DVD, DVD-RAM, DVD±RW, DVD±R, HD DVD, HD DVD-R, HD DVD-RW, HD DVD-RAM, Blu-ray Disc, any other suitable optical medium, a RAM, a PROM, an EPROM, a FLASH-EPROM, any other suitable memory chip or cartridge, memory card or any other suitable medium from which a computer can read.

It is obvious to a person skilled in the art that with the advancement of technology, the basic idea of the elevator data communication arrangement may be implemented in various ways. The elevator data communication arrangement and its embodiments are thus not limited to the examples described above; instead they may vary within the scope of the claims.

The invention claimed is:
1. An elevator comprising:
a first communication bus; and
at least one apparatus, the apparatus comprising:
  at least one bus connection configured to connect to the first communication bus;
  a communication microcontroller associated with the bus connection to control the first communication bus;
  at least one connection configured to connect at least one safety non-critical elevator components with the communication microcontroller, wherein the at least one safety non-critical elevator component is a component for controlling tasks that are not critical for the safety of the elevator; and
  at least one microcontroller configured to communicate with at least one safety critical elevator component, wherein the at least one safety critical elevator component is a component for controlling tasks that are critical for the safety of the elevator, wherein at least one of microcontroller of said at least one microcontroller is coupled with said communication microcontroller, and wherein the communication microcontroller is configured to generate a data packet comprising an identification code to indicate that the data packet comprises safety critical information when the data packet contains information from the at least one safety critical elevator component and to generate a data packet comprising non-safety critical information when the data packet contains information from the at least one safety non-critical elevator component and the communication microcontroller being further configured to send the generated data packet to the first communication bus,
wherein the at least one apparatus is connected to an elevator safety module and an elevator operation control using the first communication bus, the elevator safety module is configured to read a data packet from the first communication bus and ignore the data packet unless the data packet comprises an identification code that indicates that the data packet contains safety critical information.

2. The elevator according to claim 1, wherein said apparatus comprises at least two microcontrollers configured to communicate with safety critical components and one of said at least two microcontrollers is configured to receive and transmit further safety critical information from other microcontrollers configured communicate with safety critical elevator components.

3. The elevator according to claim 2, wherein said microcontroller configured to receive and transmit further safety critical information is configured to:
   extract the data from the received communication data packets;
   generate a new data packets comprising the information from a plurality of received data packets; and
   transmit further the generated new data packets.

4. An apparatus according to claim 2, wherein said apparatus further comprises a second communication microcontroller configured to communicate with a second communication bus.

5. An apparatus according to claim 3, wherein said apparatus further comprises a second communication microcontroller configured to communicate with a second communication bus.

6. The elevator according to claim 1, wherein said apparatus further comprises a second communication microcontroller configured to communicate with a second communication bus.

7. The elevator according to claim 6, wherein the apparatus is further configured to receive and process data packets received from said second communication bus and transmit processed data packets to said first communication bus.

8. An apparatus according to claim 7, wherein the apparatus is further configured to receive and process data packets received from said first communication bus and transmit the processed data packets to said second communication bus.

9. The elevator according to claim 6, wherein the apparatus is further configured to receive and process data packets received from said first communication bus and transmit the processed data packets to said second communication bus.

10. The elevator according to claim 1, wherein said first communication bus is a local operating network (LON) bus or controller area network (CAN) bus.

11. The elevator according to claim 1, wherein the elevator is in ordinary use and said first communication bus is configured to transport elevator calls.

12. The elevator according to claim 1, wherein
   the elevator safety module is further configured to read a data packet from the communication bus and, if the data packet comprises safety critical information, to transfer the safety critical information to at least one safety processing unit of the elevator safety module, and
   the safety processing unit is configured to perform a safety shutdown of the elevator if the safety critical information received fulfills safety shutdown criteria.

13. A communication method for an elevator system, wherein said method is performed in a communication apparatus, the method comprising:
   controlling a first communication bus by a respective communication microcontroller;
   receiving, by the respective communication microcontroller, safety non-critical communication data packets from elevator components, wherein the safety non-critical communication data packets include information for controlling tasks that are not critical for the safety of an elevator;
   receiving, by the respective communication microcontroller, safety critical communication data packets from elevator components, wherein the safety communication data packets include information for controlling tasks that are critical for the safety of the elevator;
   generating, by the respective communication microcontroller, a data packet comprising received data packets, wherein the generated data packet comprises an identification code that indicates that the data packet comprises safety critical information when the data packet is comprised of safety critical communication data packets and the generated data packet comprises an identification code that indicates that the data packet comprises safety non-critical communication data packets when the data packet contains information from the at least one safety non-critical elevator component;
   reading the data packet, by an elevator safety module connected to the first communication bus, from the first communication bus after the communication microcontroller sends the generated data packet to the first communication bus; and
   ignoring the data packet, by the elevator safety module, unless the data packet comprises an identification code that indicates that the data packet comprises safety critical information.

14. A communication method according to claim 13, wherein the method further comprises if the data packet comprises safety critical information transmitting the data packet to at least one safety processing unit of the elevator safety module.

15. A communication method according to claim 13, further comprising:
   extracting the data from the received communication data packets;
   generating a new data packet comprising the information from a plurality of received data packets; and
   transmitting further the generated data packet.

16. A communication method according to claim 13, wherein said method further comprises communicating with a second communication bus.

17. A communication method according to claim 16, wherein the method further comprises receiving and processing data packets received from said second communication bus and transmitting processed data packets to said first communication bus.

18. A communication method according to claim 16, wherein the method further comprises receiving and processing data packets received from said first communication bus and transmitting the processed data packets to said second communication bus.

19. A computer program for comprising code adapted to cause the method according to claim 13 when executed on a data-processing system.

* * * * *